(12) United States Patent
Deaver (10) Patent No.: US 8,457,347 B2
(45) Date of Patent: Jun. 4, 2013

(54) MONITORING USAGE OF A COMPUTER BY PERFORMING CHARACTER RECOGNITION ON SCREEN CAPTURE IMAGES

(76) Inventor: F. Scott Deaver, Houston, TX (US)

(*) Notice: Subject to any disclaimer, the term of this patent is extended or adjusted under 35 U.S.C. 154(b) by 836 days.

(21) Appl. No.: 12/571,291

(22) Filed: Sep. 30, 2009

(65) Prior Publication Data
US 2011/0075940 A1    Mar. 31, 2011

(51) Int. Cl.
G06K 9/00 (2006.01)
G06F 21/55 (2006.01)
G06K 9/32 (2006.01)
G06K 17/00 (2006.01)

(52) U.S. Cl.
CPC .............. *G06F 21/552* (2013.01); *G06K 9/325* (2013.01); *G06K 2017/0096* (2013.01); *G06K 2209/03* (2013.01)
USPC ............................ 382/100; 348/143; 382/181

(58) Field of Classification Search
None
See application file for complete search history.

(56) References Cited

U.S. PATENT DOCUMENTS

| | | | |
|---|---|---|---|
| 7,917,580 B2* | 3/2011 | Sim et al. | 709/203 |
| 2005/0066165 A1* | 3/2005 | Peled et al. | 713/165 |
| 2005/0086255 A1* | 4/2005 | Schran et al. | 707/102 |
| 2006/0284838 A1* | 12/2006 | Tsatalos et al. | 345/156 |
| 2007/0022372 A1 | 1/2007 | Liu et al. | |
| 2008/0196075 A1 | 8/2008 | Candelore | |
| 2009/0077617 A1 | 3/2009 | Levow et al. | |
| 2009/0100523 A1 | 4/2009 | Harris | |
| 2009/0158090 A1* | 6/2009 | Bauchot et al. | 714/15 |
| 2009/0222552 A1* | 9/2009 | Chroscielewski et al. | 709/224 |
| 2011/0075936 A1 | 3/2011 | Deaver | |
| 2011/0075942 A1 | 3/2011 | Deaver | |

OTHER PUBLICATIONS

CNet (Sep. 2008) "PC Activity Monitor Standard, Publisher's Description." Retrieved from http://download.cnet.com/PC-Activity-Monitor-Standard-PC-Acme-Standard/3000-2162_4-10322667.html.*
Jacobs et al. (Sep. 2005) "Text recognition of low-resolution document images." Proc. 8$^{th}$ Int'l Conf. on Document Analysis and Recognition, vol. 2 pp. 695-699.*

* cited by examiner

*Primary Examiner* — Barry Drennan
(74) *Attorney, Agent, or Firm* — Cardle Patent Law Chtd (57) ABSTRACT

Computer implemented methods for monitoring use of a computer and related systems and compositions of matter are disclosed herein. In various aspects, the methods may include the steps of associating an identified user with a computer, and capturing an image of a monitored region of a computer screen of the computer at a specified time. The methods include the steps of extracting image text from the image, determining image text content of the image text, and capturing a subsequent image of the monitored region of the computer screen of the computer at a subsequent time-subsequent to the specified time, in various aspects. A time difference between the specified time and the subsequent time is dependent upon image text content of the image text, in various aspects. The identified user does not control the associating step, the capturing step, the extracting step, the determining step, and the capturing a subsequent image step, in various aspects.
This Abstract is presented to meet requirements of 37 C.F.R. §1.72(b) only. This Abstract is not intended to identify key elements of the methods, systems, and compositions of matter disclosed herein or to delineate the scope thereof.

23 Claims, 7 Drawing Sheets

MONITORING USAGE OF A COMPUTER BY PERFORMING CHARACTER RECOGNITION ON SCREEN CAPTURE IMAGES

BACKGROUND OF THE INVENTION

1. Field

The present disclosure relates to computer software, and, more particularly for computer software that monitors a user's use of a computer.

2. Description of the Related Art

Corporations and other organizations have a need to monitor the use of their computer facilities to guard against abuse such as the use of the computer facilities for private (non-corporate) purposes, unlawful purposes, harassment, malicious purposes, and other nefarious activity. An informal survey of system administrators at a number of U.S. corporations indicated that the system administrators primarily rely upon control of access to the Internet to police the computers and networks under their purview. For example, most of the system administrators stated that they block ports using a firewall of one kind or another, A limited level of monitoring is sometime employed in policing of computers and networks. For example, some of the system administrators stated that they monitor network or computer content, but primarily as traps of browser addresses and text traffic through a port. Traffic volume between nodes may be monitored, but the content of the traffic is not monitored.

However, control of access to the Internet as well as the limited monitoring described above is generally ineffective in detecting computer abuse. Notwithstanding access control and monitoring, the system administrators surveyed detected many instances of computer abuse by accidental discovery. For example, an employee was discovered to be running a personal eBay store on company time, a programmer was found to be writing computer games while ostensibly on corporate time, and an employee was found to be harassing fellow employees using corporate computers over corporate networks.

Accordingly, for at least the above reasons, there is a need for methods, systems, and compositions of matter for monitoring the use of computers in order to detect abuse.

BRIEF SUMMARY OF THE INVENTION

These and other needs and disadvantages are overcome by the methods, systems, and compositions of matter disclosed herein. Additional improvements and advantages may be recognized by those of ordinary skill in the art upon study of the present disclosure.

A computer implemented method for monitoring use of a computer is disclosed herein. In various aspects, the method includes the steps of capturing an image of a monitored region of a computer screen of a computer, and extracting image text from the image.

This summary is presented to provide a basic understanding of some aspects of the methods disclosed herein as a prelude to the detailed description that follows below. Accordingly, this summary is not intended to identify key elements of the methods, systems, and compositions of matter disclosed herein or to delineate the scope thereof.

BRIEF DESCRIPTION OF THE DRAWINGS

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

Computer implemented methods for monitoring use of a computer, as well as related systems and compositions of matter are disclosed herein. The methods, systems, and compositions of matter disclosed herein may allow for monitoring the use of a computer by a user, including visual content that is displayed upon a computer screen of the computer to the user as the visual content appears to the user. The visual content may include textual content in image form, which is referred to herein as image text. The methods, systems, and compositions of matter in various aspects may allow for the monitoring of the image text.

In various aspects, the methods include the step of capturing an image of a monitored region of the computer screen of the computer, and the step of extracting image text from the image. The step of capturing an image of the monitored region of the computer screen may be under independent control, meaning the control of someone other than the user, and the image that is captured may be associated with an identified user of the computer.

The image may include the entire computer screen or portions of the computer screen. In some aspects, the image may include only what is actually visible to the user at the moment the image is captured. In other aspects, the image may include portions of all of the windows and other objects that generally lie within computer screen even though one window or object may obscure all or part of another window or object. In still other aspects, the screen may include all the windows and other objects including those portions that lie outside the view of the computer screen but that may be viewed by a user by scrolling or otherwise moving portions thereof into the view of the computer screen. The computer screen may be a physical computer screen in some aspects, while the computer screen may be a virtual computer screen in other aspects.

In some aspects, the step of capturing an image of a monitored region of a computer screen may be performed generally proximate to one or more specified times in order to monitor the images displayed upon the computer screen to the user proximate to the one or more specified times. In other aspects, the methods may include detecting one or more events generated by the user to provoke a computer operation of the computer, and then, upon detecting the one or more events, performing the step of capturing an image of a monitored region of a computer screen of a computer.

The step of the step of extracting image text from the image may employ optical character recognition [OCR] technologies, and the image may be manipulated in various ways so that the image text may be extracted from the image using OCR.

The image text may be processed in order to determine image text content of at least a portion of the image text. In various aspects, at least portions of the image, the image text, and/or the image text content may be reported to an administrator, and/or at least portions of the image, image text, and/or image text content may be archived. The nature and/or frequency of the reporting as well as the frequency at which the image is captured may be related to the image text content. For example, the presence of certain image text content may cause an increase in the frequency at which images are captured and the frequency at which image text and/or image text content is reported.

The methods disclosed herein are generally implemented in software having the form of computer readable instructions adapted to execute upon one or more computers to cause the one or more computers to implement the steps of the methods. Software may be, for example, in the form of high-level code such as C or Java, or may be in the form of machine code. In some aspects, the software may execute on one computer. In other aspects, two or more computers may communicate with one another via network, and the software may be organized in various ways such that portions of the software may be distributed over the two or more computers to be executed by the two or more computers.

The software may be configured into modules, and the modules may be organized in various ways in various aspects. Modules include routines, programs, components, data structures, etc., that perform particular tasks or implement particular abstract data types. Although generally described as implemented by software, the methods disclosed herein may be implemented in combination with other program modules and/or as a combination of hardware and software in various aspects.

As used herein, the terms "component" and "system" are intended to refer to a computer-related entity, either hardware, a combination of hardware and software, software, or software in execution. For example, a component may be a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Computer includes a terminal that may have a computer screen, keyboard, and mouse, and is linked by network to a server. In such an aspect, various software, including that disclosed herein, may execute on the one or more processors in the server, and the computer provides an input/output interface from the server to the user. Computer further includes a computer with one or more processors, memory, computer screen(s), mouse, keyboard, storage device(s), and so forth. Computer screen includes one or more computer screens in communication with the computer that may be generally viewed by the user. Computer further includes, for example, single-processor or multiprocessor computers, minicomputers, mainframe computers, as well as personal computers, hand-held computing devices, cellular telephones that include a microprocessor, and microprocessor-based or programmable consumer electronics.

The compositions of matter disclosed herein include computer readable media. Computer readable media can be any available media that can be accessed by the computer and includes both volatile and non-volatile media, removable and non-removable media. For example, computer-readable media includes computer storage media and communication media. Computer readable media includes volatile media, non-volatile media, removable media, and non-removable media implemented in any method or technology for storage of information such as computer-readable instructions, data structures, program modules or other data. Computer readable media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium that can be used to store the information and that can be accessed by the computer. Computer readable media includes computer-readable instructions, data structures, program modules or other data in a modulated data signal such as a carrier wave or other transport mechanism. The term "modulated data signal" means a signal that has one or more of its characteristics set or changed in such a manner as to encode information in the signal.

Network, as used herein, includes local area networks, wide area networks, the Internet, and combinations thereof. Communication may be conducted over the network by various wired and wireless technologies and combinations thereof. Computers may be networked with one another, and storage, various input/output devices, servers, routers and suchlike may be provided about the network, as would be recognized by those of ordinary skill in the art upon study of this disclosure.

As would be recognized by those of ordinary skill in the art upon study of this disclosure, the methods, systems, and compositions of matter disclosed herein may be practiced in distributed computing environments where certain tasks are performed by processors that are linked by network. In a distributed computing environment, modules can be located in computer readable media distributed about the network, and various processors located about the network may execute the modules. The modules and/or processors may communicate with one another via the network.

The user may be the particular person who uses the computer. The administrator may be another person of separate identity from the user. In various aspects, the user may be an employee of a corporation or other organization, and the administrator may be, for example, a systems administrator, a supervisor, a member of a corporate legal department, an administrator in a governmental or an academic setting, a law enforcement officer, a parent, or other individual having responsibility or concern for the usage of the computer, for the user, or both.

Figure 1A:
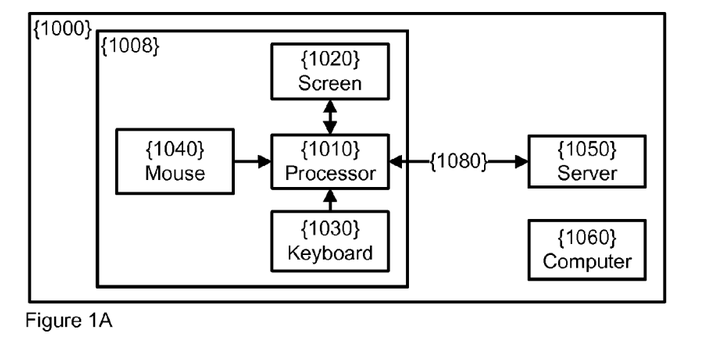
FIG. 1A illustrates by schematic diagram an exemplary implementation of a networked computer.

With reference to the Figures, FIG. 1A illustrates an implementation of a system 1000 that includes a computer 1008. The use of computer 1008 by a user may be monitored using the various methods described in this disclosure, and system 1000 including computer 1008 is provided as an exemplary system for the illustration of these methods. As illustrated in FIG. 1A, the computer 1008 includes processor 1010, computer screen 1020, keyboard 1030, and mouse 1040. The keyboard 1030 and mouse 1040 are operatively coupled to the processor 1010 to communicate input from the user to the computer 1008, and computer screen 1020 allows for visual communications between the user and the computer 1008. The computer 1008 communicates by network 1080 with server 1050, and computer 1060 is in communication with server 1050 and computer 1008 via network 1080.

Figure 1B:
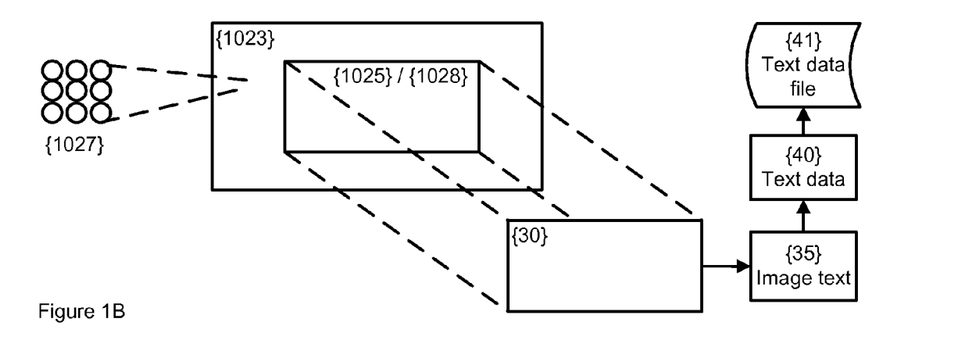
FIG. 1B illustrates by schematic diagram an exemplary implementation of a computer screen.

An implementation of computer screen 1020 is illustrated in FIG. 1B. As illustrated, the computer screen 1020 includes a number of pixels 1027 that form a screen image 1028 rendered upon the computer screen 1020. In various implementations, the pixels 1027 may have a pixel density on computer screen 1020 that ranges from about 72 pixels per linear inch to about 96 pixels per linear inch. In various implementations, the computer screen 1020 includes multiple computer screens interconnected for viewing by the user. It should be understood that the following discussion is applicable to a single computer screen 1020 as well as implementations having multiple computer screens 1020.

The computer screen(s) 1020 may be divided into a monitored region 1025 and an ignored region 1023, as illustrated in FIG. 1B. The portion of the screen image 1028 that falls within the ignored region 1023 may be generally omitted, for example, by the capture image step 12 of exemplary method 10 (see FIG. 1C), and the capture image step 12 may capture only the portion of the screen image 1028 that lies generally within the monitored region 1025.

As illustrated, the ignored region 1023 may be a region generally proximate the boundary of the computer screen 1020. The ignored region 1023 may include system clock, scrollbars, window captions, tray icons, and other such features that the administrator may decide not to monitor. The monitored region 1025 may be generally interior portions of the computer screen 1020, as illustrated in FIG. 1B. Various other divisions of the computer screen 1020 or of multiple computer screens into a monitored region 1025 and an ignored region 1023 may be made in other implementations. In various implementations, the monitored region 1025 and the ignored region 1023 may be defined by specifying specific pixels 1027 as being within the monitored region 1025 and the ignored region 1023 and/or specific sets of pixels 1027 as being within the monitored region 1025 and the ignored region 1023. The administrator may define the monitored region 1025 and the ignored region 1023 to encompass any portions of the computer screen(s) 1020. For example, the monitored region 1025 could be set to include the entire computer screen 1020 or to include only portions of the computer screen 1020 in various implementations.

As illustrated in FIG. 1B, image 30 of the portion of the screen image 1028 generally within the monitored region 1025 of the computer screen 1020 is captured. Image 30 may include image text 35. The image text 35 may be extracted from the image 30 as indicated in FIG. 1B.

Text data 40 may be captured in some implementations. Text data 40 includes textual content in character form generally associated with the screen image 1028 displayed upon computer screen 1020, where the character form may be ASCII character(s), ANSI standard character(s), rich text format [RTF] and similar format(s) and combinations of format(s). Text data 40 may include, for example, window captions and window contents when the window contents are textual in nature. For example, a window within which word processing is taking place such as a window that contains a Microsoft Word® document, the text data 40 may include the window caption and the textual content of the Microsoft Word® document. The text data 40 may include other textual information displayed upon computer screen 1020 in various implementations. The text data 40 may be collected into a text data file 41, and text data file 41 may include the identity of the user with whom the text data 41 is associated, date and time information, and other information that may be useful in later analysis of the text data 40.

Figure 1C:
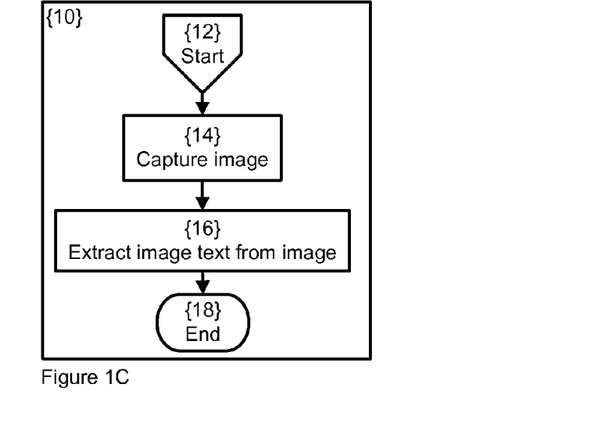
FIG. 1C illustrates by flow chart an exemplary method for monitoring the use of a computer.

FIG. 1C illustrates the capture of image 30 via the flowchart of method 10. As illustrated in FIG. 1C, method 10 is entered at step 12. The image 30 is captured of the portion of the screen image 1028 generally within the monitored region 1025 of the computer screen 1020 at step 14. The image 30 may be in various formats such as jpeg, tiff, as so forth.

The image 30 may include image text 35. The image text 35 is extracted from the image 30 at step 12 (see FIG. 1B). Method 10 terminates at step 18. In various implementations, method 10 may branch from step 18 into other processes that, for example, involve the image 30 and/or the image text 35.

Figure 2:
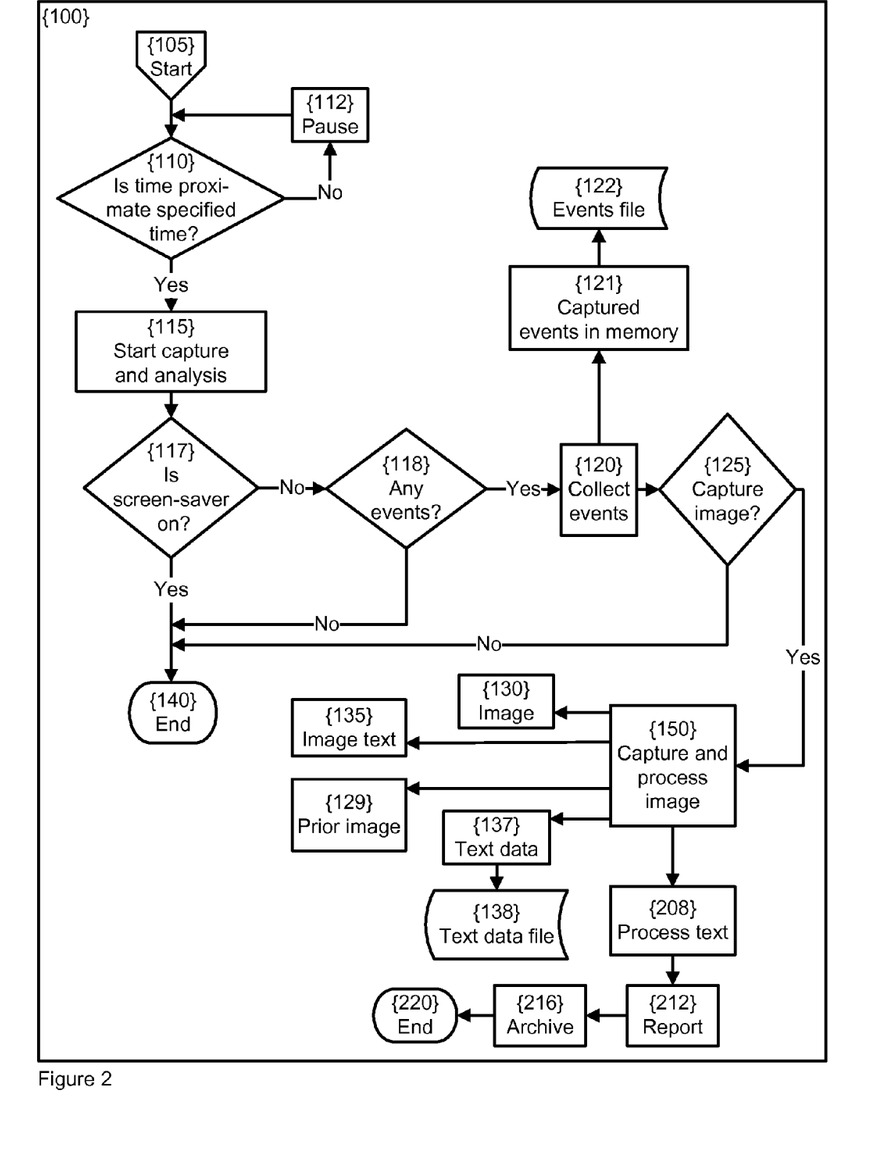
FIG. 2 illustrates by flow chart another exemplary method for monitoring the use of a computer.

FIG. 2 illustrates method 100 via flow chart. In this implementation, the method 100 is initiated at step 105. In method 100, the image 130 of a monitored region 1025 of the computer screen 1020 of the computer 1008 is captured generally proximate to a specified time. At step 110, the time is compared with the specified time. If the time is not proximate the specified time, method 100 branches to step 112. Method 100 then pauses at step 112 and, after pausing for some period of time, the method proceeds back to step 110. If the time is proximate the specified time, method 100 branches from step 110 to step 115.

Step 115 initiates the capture of the image 130 of the monitored region 1025 of the computer screen 1020. The time and the specified time may be the clock time in some implementations, so that the image 130 of the monitored region 1025 of the computer screen 1020 is captured proximate one or more clock times. The time and the specified time may be based on the occurrence of an event such as the login of the user onto the computer 1008, keystrokes on keyboard 1030, or mouse clicks of mouse 1040, in other implementations. In such implementation, the image 130 of the monitored region 1025 of the computer screen 1020 is captured proximate one or more specified times subsequent to the event(s) 121. There may be a plurality of specified times, and the time interval between the specified times may vary, in various implementations. In still other implementations, the event(s) 121 may trigger capture of the image 130 of the monitored region 1025 of the computer screen 1020, and the image 130 may be captured generally concurrent with the event(s) 121.

The method 100 checks to see if the screen saver is on at step 117. If the screen saver is on, method 100 passes from step 117 to step 140 and terminates, rather than capture the screen saver into the image 130. Following termination at step 140, method 100 may be reinitiated at step 105, for example, at some subsequent time or upon occurrence of sum subsequent event, and/or control may be passed to other modules and so forth, as would be recognized by those of ordinary skill in the art upon study of this disclosure.

If the screen saver is not on, method 100 passes from step 117 to step 118 which checks for the occurrence of events 121. Events 121 include keystrokes on keyboard 1030, mouse clicks of mouse 1040, login of the user onto the computer 1008, and other inputs into computer 1008 by the user. If no event(s) 121 have occurred, method 100 passes from step 118 to step 140 and terminates. In other implementations, step 118 may be omitted so that the image 130 of the monitored region 1025 of computer screen 1020 is captured whether or not any events 121 have occurred.

If events 121 have occurred, method 100 proceeds from step 118 to step 120 where events 121 are collected into an event file 122. The event file 122 may be subsequently analyzed, archived, and/or utilized in various ways (see FIG. 4). The event file 122 may include information about the event(s) 121 such as the keystrokes, mouse actions, time(s) proximate the occurrence of these events 121, identity of the user, and so forth.

Method 100 proceeds from step 120 to step 125. At step 125, method 100 checks the number of pixels that have changed since the capture of a prior image 129. The prior image 129 may be an image of the screen image 1028 displayed upon computer screen 1020 at a prior time, and may be generated by a prior execution of method 100. If the number of pixels that have changed since the capture of the prior image 129 is less than a specified minimum number of pixels—i.e. an insufficient number of pixels have changed since the last image capture—then method 100 proceeds to step 140 and terminates. If no prior image 129 exists, method 100 proceeds from step 125 to step 150. If the number of pixels that have changed since the capture of the prior image 129 exceeds the specified minimum number of pixels, method 100 proceeds from step 125 to step 150. At step 150, the image 130 of the screen image 1028 displayed upon computer screen 1020 is captured, and image text 135 is extracted from the image 130.

Method 100 then proceeds from step 150 to step 208. At step 208 the image text 135 and/or the text data, 137 may be processed in various ways. (see FIG. 4) After processing the image text 135 and/or the text data 137, method 100 proceeds to step 212. At step 212, the image 130, image text 135, text data 137 and other information such as clock time, date, user identity, and various information derived from the processing text step 208 may be reported at step 212. (see FIG. 4) Reporting may be to an administrator, and reporting may be by email or other notifications that may be communicated over network 1080. The administrator may receive the report at computer 1060. The reporting may include at least portions of the image 130, image text 135, text data 137, and information derived from or generally associated with the user, the image 130, image text 135, text data 137, and events 122.

In some implementations, the reporting step 212 may be in the form of the notification that is communicated by, for example, email, and the administrator may be provided with access to the image 130, image text 135, text data 137, and information derived from or generally associated with the user, the image 130, image text 135, text data 137, and events 122. For example, the image 130, image text 135, text data 137, and information derived from or generally associated with the user, the image 130, image text 135, text data 137, and events 122 may be stored on server 1050 and the administrator may access the image 130, image text 135, text data 137, and information derived from or generally associated with the user, the image 130, image text 135, text data 137, and events 122 stored on the server 1050 by FTP, through web-browser based display, through a software application specifically configured for that purpose, or in other ways. Note that the administrator does not have real time relationship with the user—i.e. the administrator may choose to view (or not view) the image 130, image text 135, text data 137, and information derived from or generally associated with the user at any time and not just at the moment these exist upon the computer 1008. The image 130, image text 135, text data 137, and events 122 may be archived to be available for use in subsequent administrative and/or legal proceedings.

Figure 3:
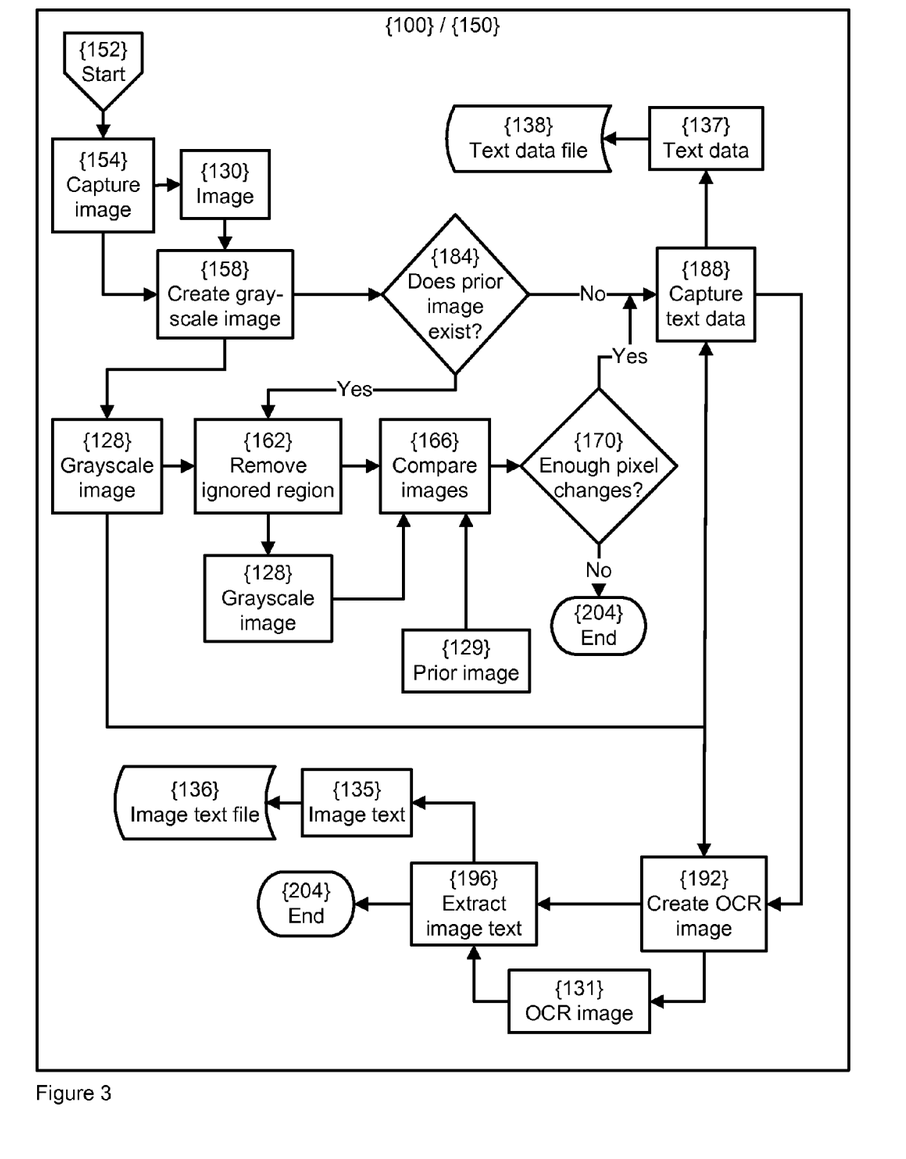
FIG. 3 illustrates by flow chart portions of the exemplary method for monitoring the use of a computer of FIG. 2.

FIG. 3 illustrates an implementation of step 150 of method 100. As illustrated in FIG. 3, step 150 is entered at step 152. Step 150 then proceeds from step 152 to step 154, and the image 130 of the screen image 1028 displayed upon computer screen 1020 is captured at step 154. Each pixel on the computer screen 1020 (the screen includes multiple computer displays, if present) is recorded into memory in its color format at the time of capture, and each in their displayed order from left to right, top to bottom. In the current implementation, once captured the entire memory image is copied as a grayscale image into another area of memory. This is because all comparisons in the current implementation are made of one grayscale image to another, and when a color pixel is required, it is drawn from the original captured color image by its location corresponding to the grayscale pixel being compared.

The image 130 is converted from a color image to a grayscale image 128 at step 158. The grayscale image 128 may be 256-color grayscale in various implementations. The method 100 checks for the existence of a prior image 129 at step 184 and branches from step 184 depending upon whether or not a prior image 129 exists.

If there is no prior image 129, step 150 of method 100 proceeds from step 184 to step 188. At step 188, text data 137 is captured. The text data 137 may be collected into a text data file 138, and text data file 138 may include the identity of the user with whom the text data 137 is associated, date and time information, and other information that may be useful in later analysis of the text data 137.

At step 192, grayscale image 128 is converted into an OCR image 131 of sufficient quality that OCR software can generally recognize alphanumeric characters imbedded within the OCR image 131. The conversion of grayscale image 128 into an OCR image 131 is further elucidated in FIGS. 5 to 11 and the associated discussion.

The OCR image 131 created at step 192 is then processed by an OCR engine to extract the image text 135 from the OCR image at step 196. In various implementations the OCR engine may be a commercially available OCR product such as OmniPage®, SimpleOCR®, Tesseract®, or Abby FineReader®. The image text 135 extracted from the OCR image 131 may be organized into an image text file 136. The image text file 136 may include the identity of the user with whom the image text 135 is associated, date and time information, and other information that may be useful in later analysis of the image text 135. Step 150 of method 100 then passes from step 196 to step 204 and terminates at step 204.

If there is a prior image 129, step 150 of method 100 proceeds from step 184 to step 162. At step 162 the portions of the grayscale image 128 that correspond to the ignored region 1023 of computer screen 1020 is removed from the grayscale image 128. Grayscale image 128 is compared with prior image 129 at step 166. If not enough pixels have changed per the test at step 170, method 100 passes from step 170 to step 204 and terminates, as there is not enough change in the grayscale image 128 from the prior image 129 to warrant further processing of grayscale image 128. If enough pixels have changed per the test at step 170, control passes from step 170 to step 188 and proceeds from step 188 as described above.

Figure 4:
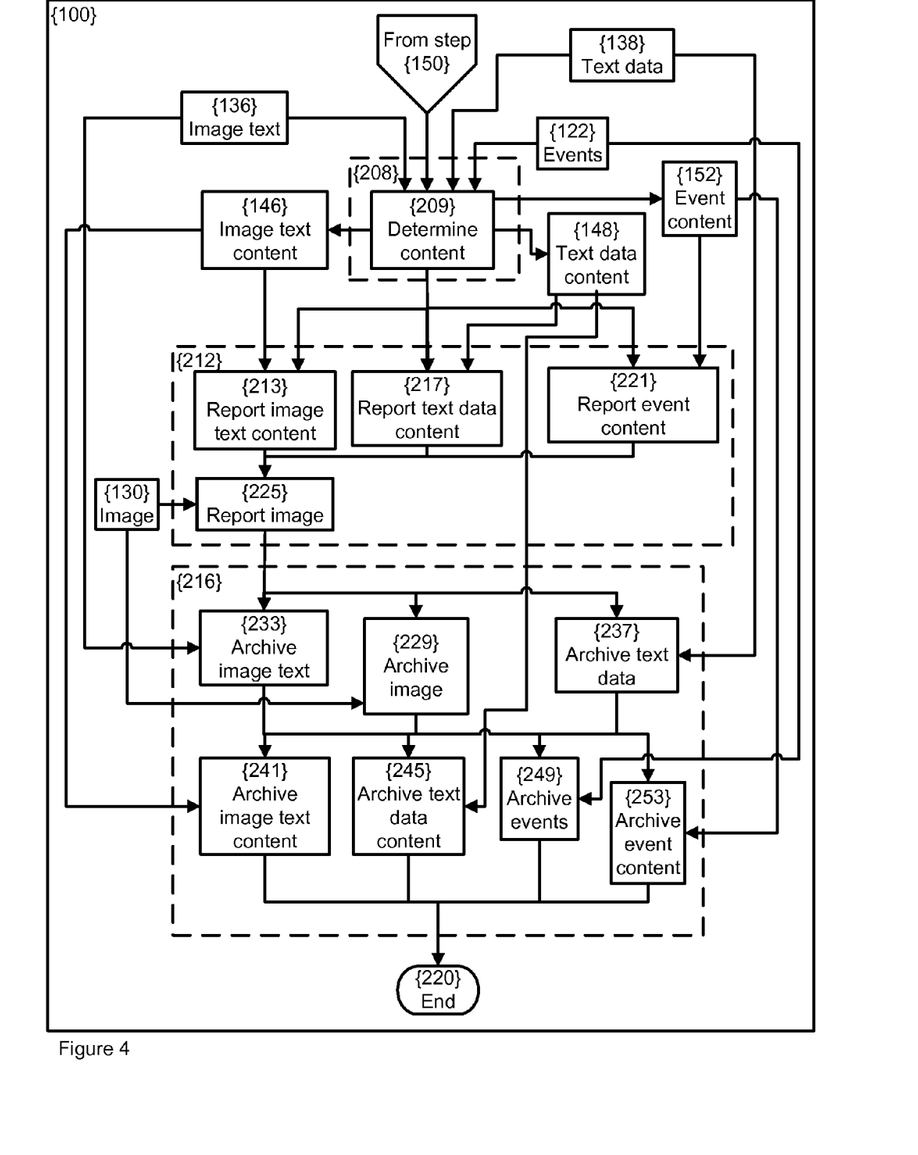
FIG. 4 illustrates by flow chart portions of the exemplary method for monitoring the use of a computer of FIG. 2.

FIG. 4 describes step 208, step 232, and step 216 of method 100 in further detail. As illustrated in FIG. 4, method 100 enters step 208 from step 150. At step 208, the content of the image text 136, the text data 138, and/or events 122 may be determined. For example, the image text 136, the text data 138, and/or events 122 may be searched for content such as key words or phrases, and, if found, those portions of the image text 136, the text data 138, and/or events 122 that contain such content may be placed into files of image text content 146, text data content 148, and event content 152, respectively. The image text 136, the text data 138, and/or events 122 may be analyzed for content in other ways and the content placed into image text content 146, text data content 148, and event content 152, respectively.

Method 100 passes from step 208 to 212. At step 212, the image 130 may be reported per step 225. At least portions of the image text content 146 may be reported per step 213. At least portions of the text data content 148 may be reported per step 217, and at least portions of the event content 152 may be reported per step 221. In other implementations, at least portions of the image text 136, the text data 138, and/or events 122 may be reported.

The nature of the reporting may be dependent upon image text content 146, text data content 148, and/or event content 152. For example, certain image text content 146, text data content 148, and event content 152 may trigger more frequent reporting, may alter the type and quantity of information within the reports, or may alter the administrator(s) to whom the reports are directed. Certain image text content 146, text data content 148, and event content 152 may alter the frequency and extent of the monitoring in various implementations. For example, certain image text content 146, text data content 148, and/or event content 152 may trigger more frequent collection of image 130 and extraction of image text 136 from image 130. The image text content 146, text data content 148, and/or event content 152 is determined generally without human intervention and the subsequent actions taken, if any, based upon the content are automatic generally without human intervention. Method 100 passes from step 212 to 216. At step 216, the image 130 (step 229), image text 136 (step 233), text data 138 (step 237), image text content 146 (step 241), text data content 148 (step 245), events 122 (step 249), and/or event content 152 (step 253) may be archived. By archived, it is meant that the image 130, image text 136, text data 138, image text content 146, text data content 148, events 122, and/or event content 152 are stored to a generally permanent non-volatile media so that the image 130, image text 136, text data 138, image text content 146, text data content 148, events 122, and/or event content 152 may be retrieved at some later time. The non-volatile media, for example, may be magnetic, optical, or semiconductor based, may be generally fixed or may be removable, and may be located anywhere about network 1080. The image 130, image text 136, text data 138, image text content 146, text data content 148, events 122, and/or event content 152 may be archived in various compressed formats in various implementations. Method 100 then passes from step 216 to step 220 and terminates. The archiving of image 130 in compressed format is described in co-pending U.S. patent application Ser. No. 12/571,308 entitled "METHODS FOR DIGITAL IMAGE COMPRESSION" by F. Scott Deaver and filed on the same date as the present application, which is hereby incorporated by reference in its entirety herein.

In some implementations, at least a portion of the steps of method 100 is performed on monitored computer 1008. Substantially all of the steps of method 100 prior to and including step 209 may be performed on the monitored computer 1008 in some implementations. In such implementations, only upon detection of certain image text content 146, text data content 148, and/or event content 152 are the archiving steps 233, 229, 237, 241, 245, 249, 253 and/or reporting steps 213, 217, 221, 225 performed. This may minimize network traffic on the network 1080, the requirements for storage space, network bandwidth, and otherwise decrease the overhead imposed by method 100.

At step 192 (see FIG. 11), grayscale image 128 is converted into an OCR image 131 of sufficient quality that OCR software can generally recognize alphanumeric characters imbedded within the OCR image 131. The grayscale image 128 may include alphanumeric characters such as, for example, alphanumeric characters 311 in FIG. 5, which are generally at the native resolution of the computer screen 1020, which is about 72 dots per inch (dpi). In other implementations, the computer screen 1020 may have other resolutions so that the alphanumeric formed thereupon may have resolutions greater than or less than about 72 dpi.

Figure 5:
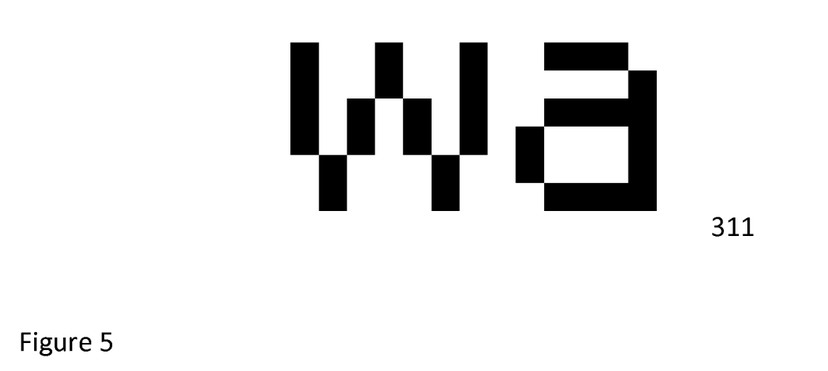
FIG. 5 illustrates exemplary alphanumeric characters at a first stage of processing.
Figure 6:
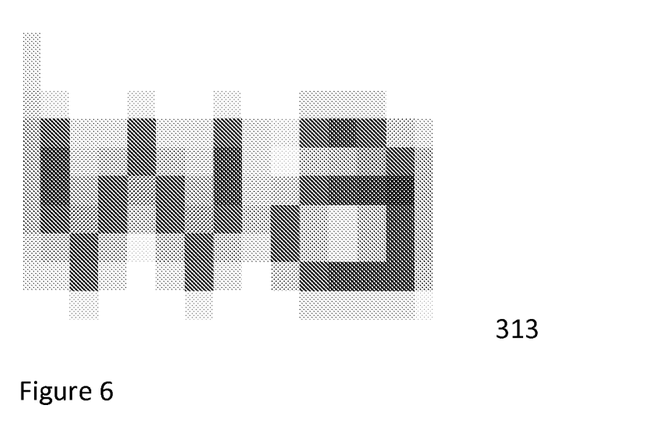
FIG. 6 illustrates exemplary alphanumeric characters at a second stage of processing.

Exemplary alphanumeric characters 311 are generated by a standard Windows Explorer application at 72 dpi on a 1600 by 1200 pixel display in 24-bit true-color mode. Alphanumeric characters 311 are in the default Windows screen font, which may be used for more than 70 percent of the text appearing on computer screen 1020. Alphanumeric characters 311 are formed with a san-serif font that is a narrow single-pixel font with significant aliasing and single-pixel spacing between characters, which may present a challenge to the OCR engine's ability to accurately process alphanumeric characters 311.

In order for an OCR engine to process alphanumeric characters 311, the resolution of the alphanumeric characters 311 should be increased from 72 dpi in grayscale image 128 to lie generally in the range of from about 200 dpi to about 300 dpi or more, and the aliasing should be substantially eliminated in the OCR image 131. In creating the OCR image 131, method 100 generally increases the resolution of the alphanumeric characters from about 72 dpi to more than about 200 dpi. In various implementations, the resolution of the alphanumeric characters 311 is generally increased to fall within the range of from about 200 dpi to about 300 dpi. In various implementations, the resolution of the alphanumeric characters 311 may be increased to more than about 300 dpi.

The process of increasing the resolution of a portion of grayscale image 128 that includes alphanumeric characters 311 from a resolution of about 72 dpi to a resolution within the range of from about 200 dpi to about 300 dpi or more in the OCR image 131 may be done in a plurality of step increases as described in the following. In general, one or more filters are applied to the grayscale image 128 to remove short wavelength signals and/or long wavelength signals, anti-aliasing is applied to sharpen the image, and then the resolution is increased. The process of applying one or more filters plus anti-aliasing and then increasing the resolution may be repeated until the desired resolution is achieved in the OCR image 131. This process, which is generally implemented by step 192 of method 100, is illustrated in FIGS. 5 to 10 and by the flowchart of FIG. 11. Again, it should be recognized that the specific processes, the order of the processes, and the values used in the processes as set forth in this discussion of FIGS. 5 to 11, as well as generally throughout this disclosure, are exemplary only and are not to be considered as limiting.

Figure 11:
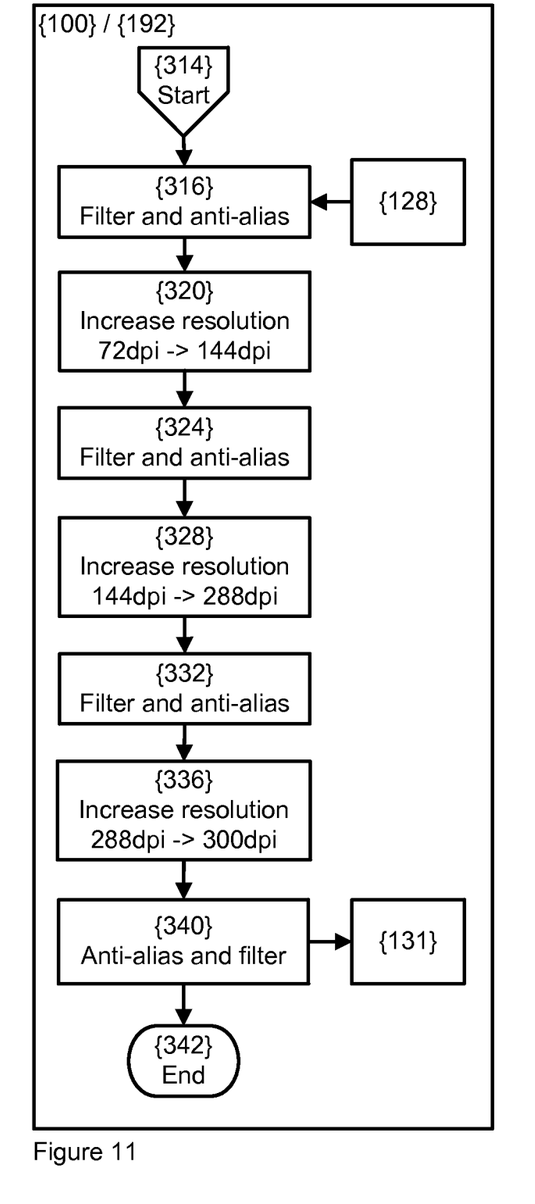
FIG. 11 illustrates by flow chart portions of the exemplary method for monitoring the use of a computer of FIG. 2.

As illustrated in FIG. 11, entry into step 192 of method 100 is at step 314. At step 316 of step 192 of method 100, a Gaussian blur using a 0.3-pixel radius is applied to a portion of grayscale image 128 that includes alphanumeric characters 311 (FIG. 5) to produce alphanumeric characters 313 illustrated in FIG. 6.

At step 320, the resolution of alphanumeric characters 313 is doubled from 72 dpi to 144 dpi using bi-cubic interpolation.

Figure 7:
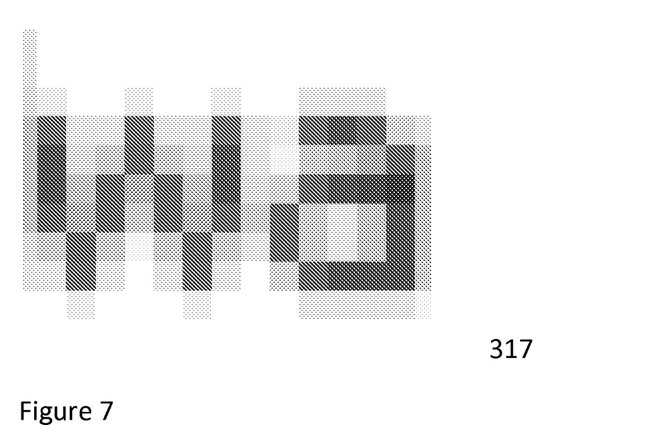
FIG. 7 illustrates exemplary alphanumeric characters at a third stage of processing
Figure 8:
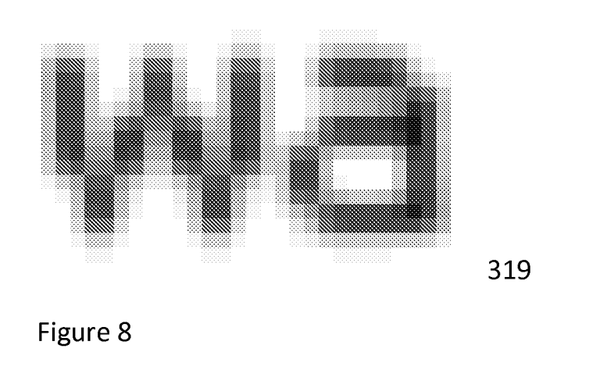
FIG. 8 illustrates exemplary alphanumeric characters at a fourth stage of processing.

At step 324, anti-aliasing is first applied. The resulting alphanumeric characters 317 are illustrated in FIG. 7. Then, an unsharp mask is applied to alphanumeric characters 317 with a mask opaqueness of 240 percent, a radius 0f 3.7 pixels, and a threshold of 9 levels followed by a Gaussian blur with a radius 0f 0.6 pixels. The resulting alphanumeric characters 319 are illustrated in FIG. 8.

At step 328, the resolution of the alphanumeric characters 319 is doubled from 144 dpi to 288 dpi using bi-cubic interpolation.

Figure 9:
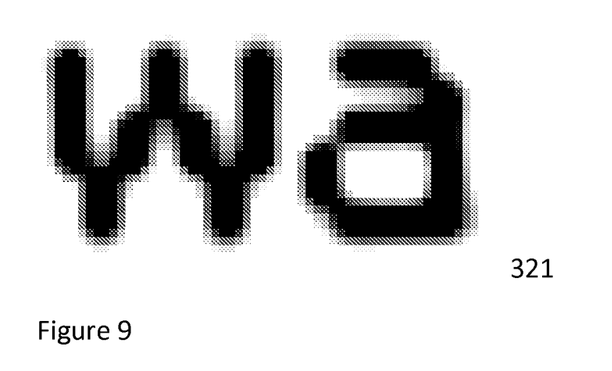
FIG. 9 illustrates exemplary alphanumeric characters at a fifth stage of processing.

Anti-aliasing is applied following the bi-cubic interpolation, and then a 223-percent unsharp mask with a 7.6-pixel radius using 9 levels is applied at step 332. The resulting alphanumeric characters 321 are illustrated in FIG. 9.

Alphanumeric characters 321 are then resolved from a resolution of 288 dpi to a resolution of 300 dpi using bi-cubic interpolation at step 336.

Figure 10:
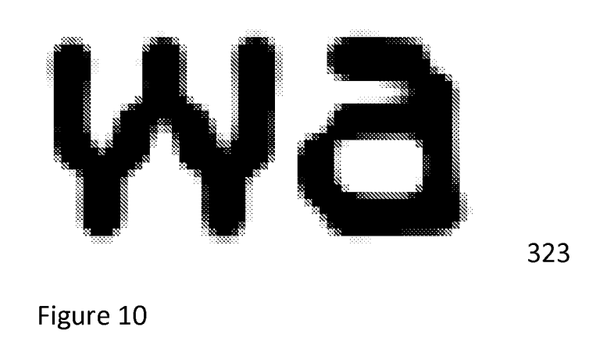
FIG. 10 illustrates exemplary alphanumeric characters at a sixth stage of processing.

At step 340, anti-aliasing, Gaussian blur using a radius 0f 0.6 pixels, an unsharp mask with a mask opaqueness of 204 percent, a radius 0f 4.8 pixels, and a threshold of 8 levels, and another Gaussian blur using a radius 0f 0.6 pixels are applied sequentially. The resulting alphanumeric characters 323 as found in the OCR image 131 are illustrated in FIG. 10.

In various implementations, a sliding window may be applied to the grayscale image 128 or to various images intermediate of the grayscale image 128 and the OCR image 131. For example, the sliding window may be applied between step 316 and step 320. The width and height of the sliding window may be, for example, three pixels wide and three pixels tall. The height and the width may be adjustable. The values of every pixel in the window (9 pixels in this Example) are distributed by a weighting scheme to their byte-wise extremes. The pixel with the lowest value of the nine will be assigned a value of 0, and the pixel with the highest value of the group will be assigned a value of 255. Every other pixel in the group will be assigned a value based on its original relationships with the previous high and low values, recalculated to a range of 0 to 255. The sliding window moves pixel by pixel about the image and assigns values to the pixel within the window after each move.

The application of the sliding window may improve the distinction between the alphanumeric characters and the background, meaningful pixels may be darkened, and less-meaningful pixels may be lightened. Noise pixels created by the Gaussian blurring, unsharp mask, and anti-aliasing operations may be eliminated.

The foregoing discussion along with the Figures discloses and describes various exemplary implementations. These implementations are not meant to limit the scope of coverage, but, instead, to assist in understanding the context of the language used in this specification and in the claims. Accordingly, variations of the methods as well as systems and compositions of matter that differ from these exemplary implementations may be encompassed by the appended claims. Upon study of this disclosure and the exemplary implementations herein, one of ordinary skill in the art may readily recognize that various changes, modifications and variations can be made thereto without departing from the spirit and scope of the inventions as defined in the following claims.

What is claimed is:

1. A computer implemented method for monitoring use of a computer, comprising the steps of:
    associating an identified user with a computer,
    capturing an image of a monitored region of a computer screen of the computer at a specified time;
    extracting image text from the image;
    determining image text content of the image text;
    capturing a subsequent image of the monitored region of the computer screen of the computer at a subsequent time subsequent to the specified time, a time difference between the specified time and the subsequent time is dependent upon image text content of the image text; and
    the associating step, the capturing step, the extracting step, the determining step, and the capturing a subsequent image step are not controlled by the identified user.

2. The method, as in claim 1, further comprising the step of:
    associating the image with the identified user of the computer.

3. The method, as in claim 1, further comprising the step of:
    reporting at least a portion of the image text content.

4. The method, as in claim 1, further comprising the step of:
    reporting at least a portion of the image text content based upon the image text content.

5. The method, as in claim 1, further comprising the step of:
    archiving at least a portion of the image text content.

6. The method, as in claim 1, further comprising the step of:
    archiving at least a portion of the image text content based upon the image text content.

7. The method, as in claim 1, further comprising the step of:
    archiving at least a portion of the image text.

8. The method, as in claim 1, further comprising the steps of:
    selecting the specified time by detecting an event generated by the identified user, the event provoking a computer operation of the computer.

9. The method, as in claim 8, further comprising the step of:
    associating the event with the identified user.

10. The method, as in claim 8, further comprising the step of:
    determining event content of the event.

11. The method, as in claim 10, further comprising the step of:
    reporting at least a portion of the event content.

12. The method, as in claim 10, further comprising the step of:
    reporting at least a portion of the event content based upon the event content.

13. The method, as in claim 10, further comprising the step of:
    archiving at least a portion of the event content.

14. The method, as in claim 13, wherein the step of archiving at least a portion of the event content is initiated based upon the event content.

15. The method, as in claim 1, further comprising the step of:
    capturing text data from the monitored region.

16. The method, as in claim 15, further comprising the step of:
    determining text data content of the text data.

17. The method, as in claim 16, further comprising the step of:
    reporting the text data content.

18. The method, as in claim 16, further comprising the step of:

reporting the text data content based upon the text data content.

19. The method, as in claim 16, further comprising the step of:

archiving at least a portion of the text data content.

20. The method, as in claim 19, wherein the step of archiving at least a portion of the text data is initiated based upon the text data content.

21. The method, as in claim 16, further comprising the step of:

archiving at least a portion of the image based upon the text data content.

22. The method, as in claim 1, further comprising the step of:

archiving at least a portion of the image.

23. The method, as in claim 1, further comprising the step of:

archiving at least a portion of the image based upon the image text content.

* * * * *